United States Patent
Ohira et al.

(10) Patent No.: US 9,716,421 B2
(45) Date of Patent: Jul. 25, 2017

(54) RESOLVER DEVICE, MOTOR, AND ACTUATOR

(71) Applicant: NSK LTD., Tokyo (JP)

(72) Inventors: Kazuhiro Ohira, Kanagawa (JP); Masaki Kuwahara, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/105,129

(22) PCT Filed: Jan. 14, 2015

(86) PCT No.: PCT/JP2015/050813
§ 371 (c)(1),
(2) Date: Jun. 16, 2016

(87) PCT Pub. No.: WO2015/111485
PCT Pub. Date: Jul. 30, 2015

(65) Prior Publication Data
US 2017/0005549 A1    Jan. 5, 2017

(30) Foreign Application Priority Data

Jan. 27, 2014 (JP) ................................. 2014-012690
May 26, 2014 (JP) ................................. 2014-108474

(51) Int. Cl.
*G01D 5/20* (2006.01)
*H02K 11/225* (2016.01)
*H02K 24/00* (2006.01)
*H02K 37/04* (2006.01)

(52) U.S. Cl.
CPC ......... *H02K 11/225* (2016.01); *G01D 5/2046* (2013.01); *H02K 24/00* (2013.01); *H02K 37/04* (2013.01)

(58) Field of Classification Search
CPC .... G01D 5/2046; H02K 11/225; H02K 24/00; H02K 37/04
USPC ......................................................... 310/68 B
See application file for complete search history.

(56) References Cited

U.S. PATENT DOCUMENTS 3,281,655 A * 10/1966 Blasingame ............ G01P 3/483
310/168
3,641,467 A *  2/1972 Ringland ............... H02K 29/12
318/661
4,255,682 A      3/1981 Toida et al.
(Continued)

FOREIGN PATENT DOCUMENTS

JP   55-046862 A       4/1980
JP   01218344 A  *  8/1989
(Continued)

OTHER PUBLICATIONS

Translation of foreign document JP 2000116094 A (Year: 2000).*
(Continued)

*Primary Examiner* — Alex W Mok
(74) *Attorney, Agent, or Firm* — Sughrue Mion, PLLC (57) ABSTRACT

A resolver device includes a stator core and a rotor core supported so as to be freely rotatable with respect to the stator core and configured such that a reluctance component in a gap between the rotor core and the stator core changes in accordance with a relative angle position to the stator core. The stator core includes stator main poles and stator interpoles.

6 Claims, 9 Drawing Sheets (56) References Cited

U.S. PATENT DOCUMENTS

| | | | | |
|---|---|---|---|---|
| 4,631,510 A * | 12/1986 | Nagarkatti | ............ | H02K 29/12 |
| | | | | 310/168 |
| 4,794,511 A * | 12/1988 | Lundin | ................. | H02K 24/00 |
| | | | | 310/168 |
| 5,763,976 A * | 6/1998 | Huard | ................... | H02K 24/00 |
| | | | | 29/598 |
| 6,137,204 A * | 10/2000 | Kuwahara | ............. | H02K 24/00 |
| | | | | 310/162 |
| 7,990,019 B2 * | 8/2011 | Sung | ..................... | H02K 21/14 |
| | | | | 310/114 |
| 2003/0090223 A1 * | 5/2003 | Nishizawa | ............ | G01D 3/022 |
| | | | | 318/268 |
| 2004/0007926 A1 | 1/2004 | Tsukada | | |
| 2004/0174162 A1 | 9/2004 | Kuwahara | | |

FOREIGN PATENT DOCUMENTS

| | | |
|---|---|---|
| JP | 01-243839 A | 9/1989 |
| JP | 2624747 B2 | 6/1997 |
| JP | 2000-116094 A | 4/2000 |
| JP | 2004-271284 A | 9/2004 |
| JP | 3909474 B2 | 4/2007 |
| JP | 2008-125306 A | 5/2008 |
| WO | 02/25216 A1 | 3/2002 |

OTHER PUBLICATIONS

Translation of foreign document JP 01218344 A (Year: 1989).*
Notice of rejection issued in the corresponding JP App. No. 2014-108474 dated Aug. 26, 2015.
International Search Report of PCT/JP2015/050813 dated Mar. 24, 2015 [PCT/ISA/210].

* cited by examiner

RESOLVER DEVICE, MOTOR, AND ACTUATOR

CROSS REFERENCE TO RELATED APPLICATIONS

This application is a National Stage of International Application No. PCT/JP2015/050813, filed Jan. 14, 2015, claiming priorities based on Japanese Patent Application Nos. 2014-012690, filed Jan. 27, 2014 and 2014-108474, filed May 26, 2014 the contents of all of which are incorporated herein by reference in their entirety.

BACKGROUND OF THE INVENTION

1. Field of the Invention

The present invention relates to a resolver device, a motor, and an actuator.

2. Description of the Related Art

A resolver device is known as a detector that magnetically detects, with high resolution, a rotation angle position or the like of a rotor of a motor in order to detect the number of rotations or a rotation angle of rotary motion. For example, Prior Art 1 describes a two-pole variable reluctance resolver having a stator and a rotor configured such that reluctance in an air gap between a rotor iron core and stator teeth changes in accordance with a position of the rotor iron core, and a fundamental wave component of the reluctance change generated in one rotation of the rotor iron core corresponds to one period. The two-pole variable reluctance resolver detects a rotation angle position or a rotation speed by detecting the reluctance change. Specifically, three stator teeth each separately having a three-phase AC excitation winding and an output winding are provided in the two-pole variable reluctance resolver at intervals of 120°, and another three stator teeth each having an excitation winding similar to the three-phase AC excitation winding and an output winding wound in the reverse direction with respect to the output winding are provided at positions 180° symmetric with respect to the respective phase stator teeth, whereby a set A of stator teeth is obtained. A set B of stator teeth has windings similar to those of the six stator teeth of the set A, and each of the stator teeth of the set B is provided at a position shifted by 90° with respect to the corresponding one of the six stator teeth of the set A, whereby output of each output winding is composed.

PRIOR ART

Prior Art 1: JP 2624747 B2

A resolver described in Prior Art 1 can suppress a second harmonic wave. However, the resolver described in Prior Art 1 can only suppress a third harmonic wave to a limited extent, and reliability of detection might be lowered.

The present invention has been made in consideration of the above, and an object thereof is to provide a resolver device, a motor, and an actuator that suppress a third harmonic wave and improve reliability.

SUMMARY OF THE INVENTION

A resolver device of the present invention comprising: a stator core; and a rotor core supported so as to be freely rotatable with respect to the stator core and configured such that a reluctance component in a gap between the rotor core and the stator core changes in accordance with a relative angle position to the stator core, wherein the stator core includes: a plurality of stator main poles, the number of which is an even multiple of three that is the number of phases, and that are arranged along a circumferential direction of a ring-shaped stator base such that respective wound exciting coils output three-phase output signals each of which is shifted by an electrical angle of +120 degrees or an electrical angle of −120 degrees in response to a one-phase excitation input signal; and a plurality of stator interpoles for respective phases arranged along the circumferential direction of the ring-shaped stator base at a position where the one-phase excitation input signal is input to each wound exciting coil and a second harmonic wave is suppressed with respect to the output signals for the respective phases, the stator interpoles for the respective phases add output of exciting coils wound around the corresponding stator interpoles for the respective phases to the output signals of the corresponding stator main poles for the respective phases, to compose three-phase resolver signals, and the three-phase resolver signals are subjected to a three-phase/two-phase conversion to obtain two-phase resolver signals.

The resolver device of the present invention can suppress a second harmonic wave by means of a stator main pole and a stator interpole. The resolver device of the present invention can also cancel a third harmonic wave by obtaining angle information after conversion to a second phase by means of a three-phase/two-phase conversion. As a result, accuracy of the angle information is increased and reliability is improved.

According to a preferred aspect, it is preferable that each of the stator interpoles for the respective phases is arranged at a position shifted by an electrical angle of +90 degrees or an electrical angle of −90 degrees with respect to at least one of the corresponding stator main poles for the respective phases. This structure allows the resolver device to suppress the second harmonic wave.

According to a preferred aspect, it is preferable that the rotor core includes rotor teeth projecting to a side facing the stator core, and when the number of the stator main poles is P and the number of the rotor teeth is q, the following Equation (1) is satisfied:

$$P = (q/(M \pm (N \pm 1)/N)) \qquad (1)$$

where N is three that is the number of the phases, and M is an integer variable that satisfies the Equation (1).

This structure increases the degree of freedom in the number of rotor teeth.

According to a preferred aspect, it is preferable that each of the stator interpoles for the respective phases is arranged at a position shifted by a mechanical angle of +90 degrees or a mechanical angle of −90 degrees with respect to at least one of the corresponding stator main poles for the respective phases. This structure allows the resolver device to detect one period when a rotor core makes one rotation, whereby an absolute angle is easily calculated.

According to a preferred aspect, it is preferable that the rotor core is configured such that a center of an inner diameter is shifted from a center of an outer diameter, and the rotor core outputs the output signal corresponding to one period per rotation of the rotor core. This structure allows the resolver device to detect one period when the rotor core makes one rotation, whereby the absolute angle is easily calculated.

According to a preferred aspect, it is preferable that a motor includes the above-mentioned resolver device, the rotor core rotates in conjunction with a motor rotor, and the resolver device detects rotation of the motor rotor. This structure suppresses the third harmonic wave, and achieves the motor with improved reliability.

According to a preferred aspect, it is preferable that a motor includes the resolver device, the rotor core rotates in conjunction with a motor rotor, the resolver device is capable of detecting rotation of the motor rotor, and the motor includes pole pairs, the number of which is the same as the number of the teeth q of the rotor core. This structure allows the number of electrical cycles per rotation of the rotor core of the resolver device to coincide with the number of the pole pairs of the motor, thereby facilitating commutation for controlling motor driving current.

According to a preferred aspect, it is preferable that an actuator includes the above-mentioned resolver device and is capable of transmitting rotary motion that is detectable by the resolver device. This structure suppresses the third harmonic wave, and achieves the actuator with improved reliability.

According to the present invention, it is possible to provide a resolver device, a motor, and an actuator that suppress a third harmonic wave and improve reliability.

DETAILED DESCRIPTION OF THE PREFERRED EMBODIMENT

Embodiments for practicing the present invention (embodiments) will be described in detail with reference to the drawings. The present invention is not limited by the contents described in the following embodiments. Components described below include a component that is easily conceived by a person skilled in the art, and a component that is substantially identical thereto. Furthermore, the components described below can be appropriately combined.

Figure 1:
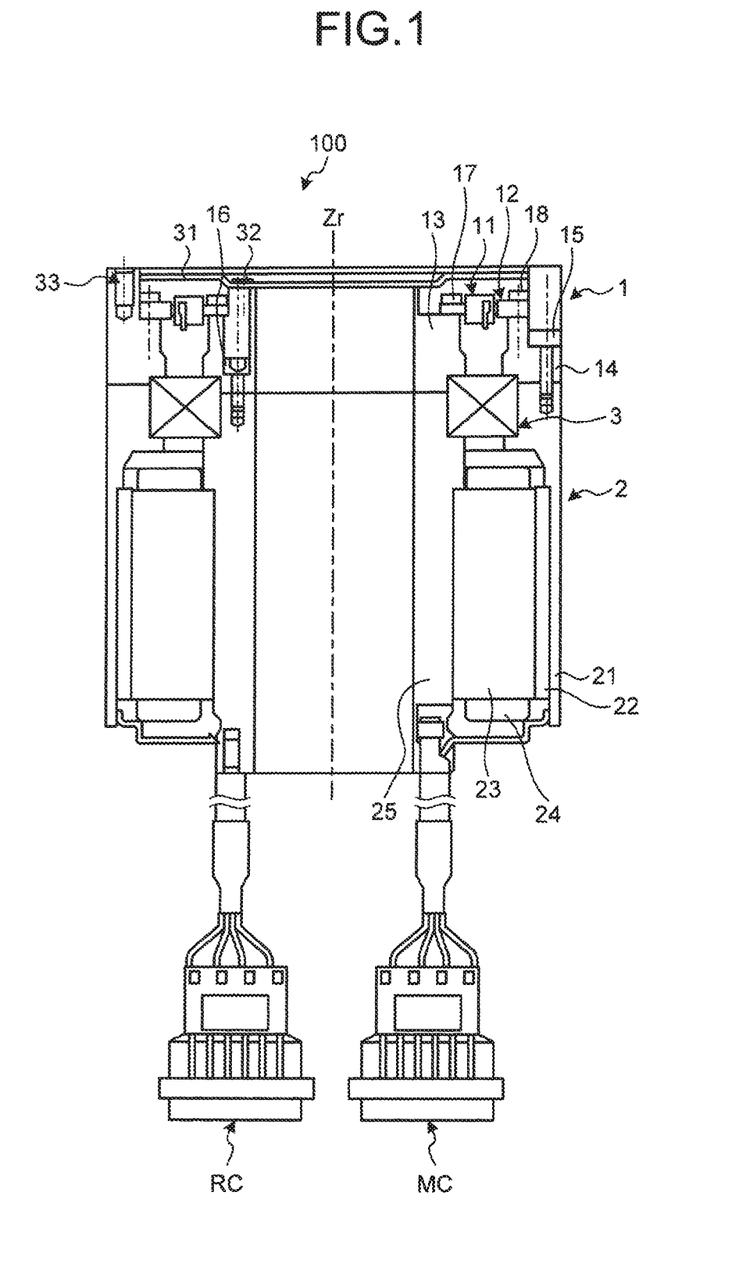
FIG. 1 is a structure view of a motor device having a resolver device according to a first embodiment.
Figure 2:
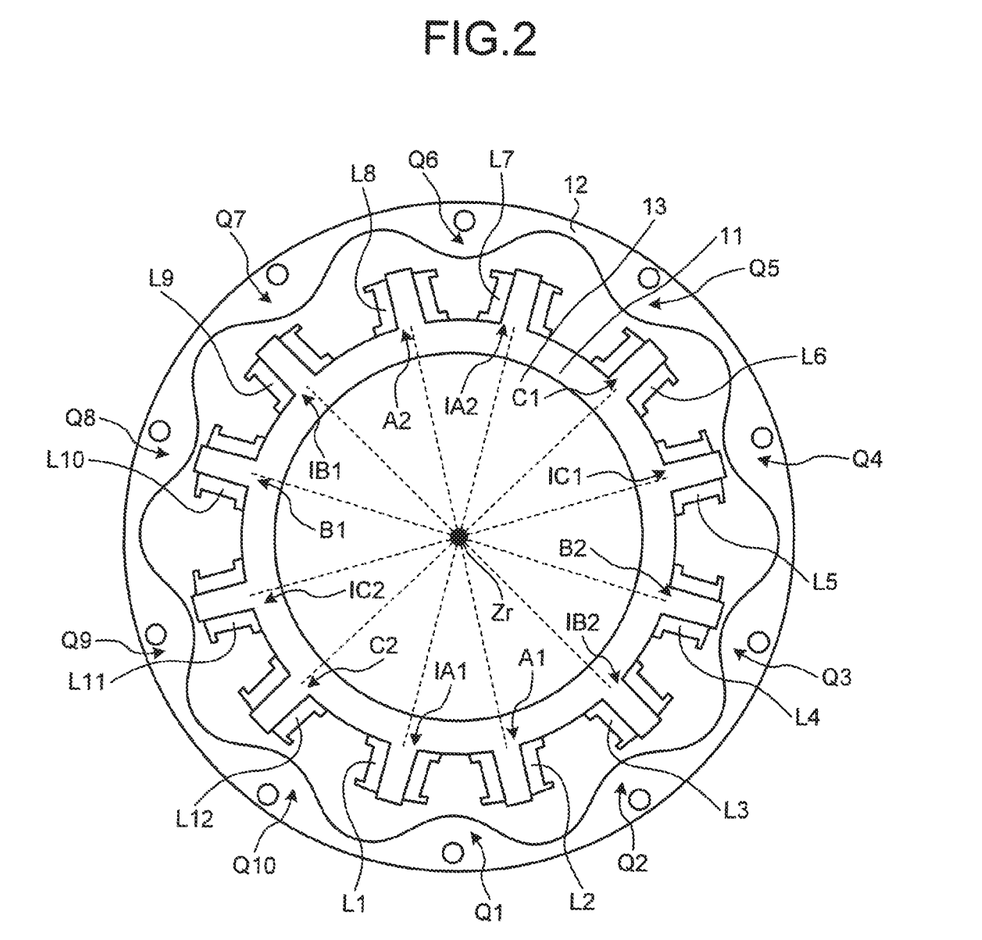
FIG. 2 is a cross-sectional view of the resolver device according to the first embodiment taken along a virtual plane orthogonal to an axial direction illustrated in FIG. 1.
Figure 3:
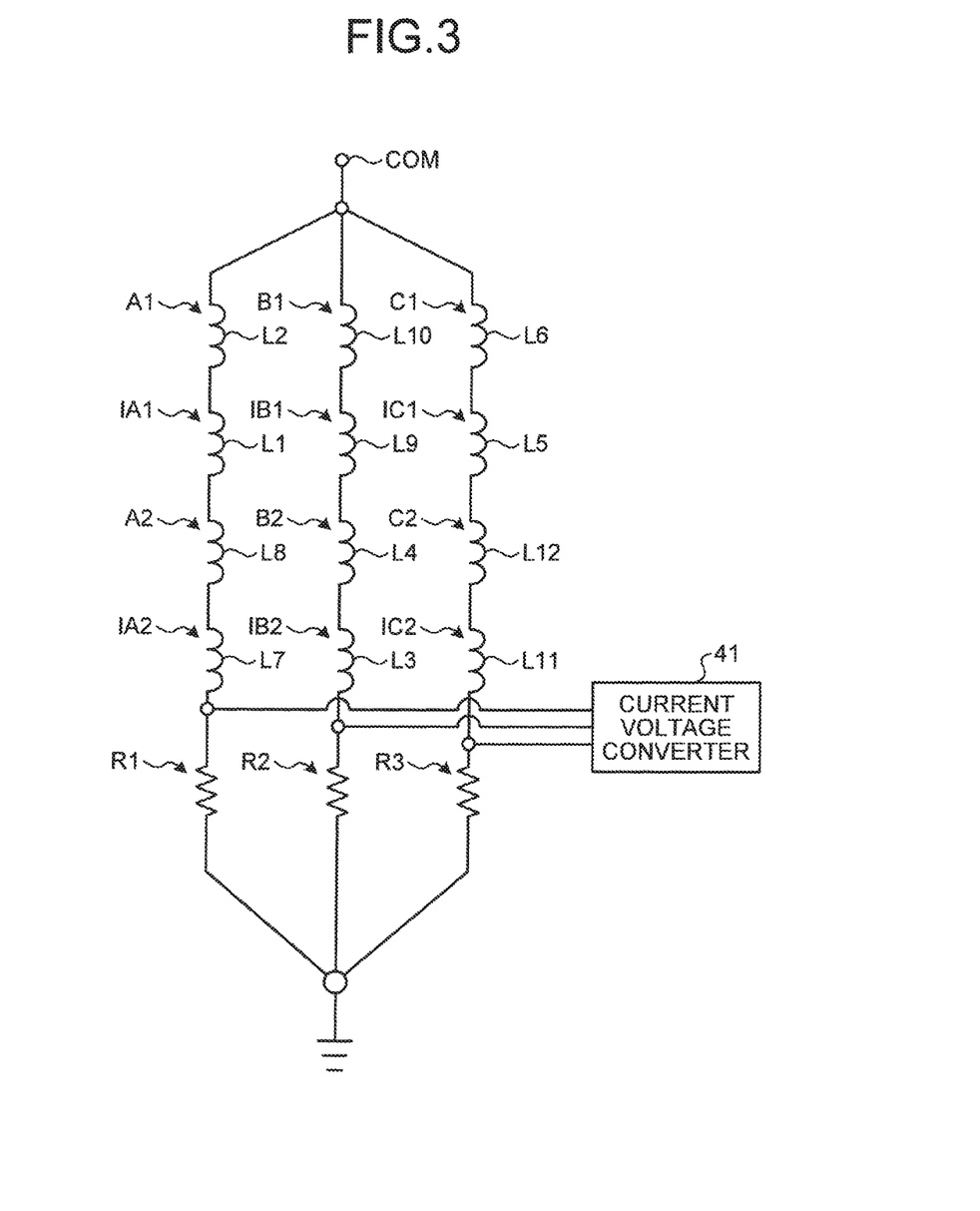
FIG. 3 is a connection diagram of exciting coils of the resolver device.
Figure 4:
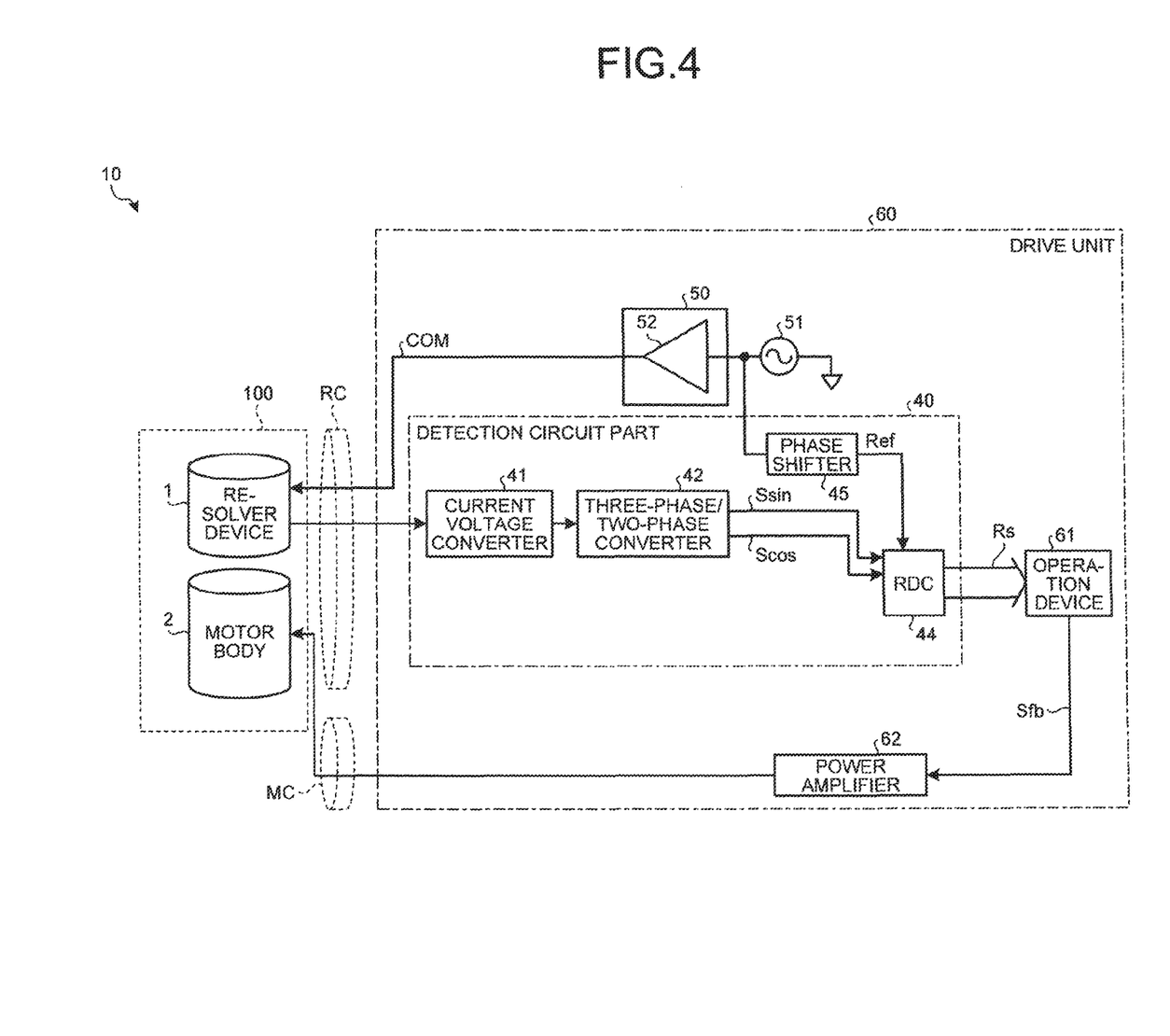
FIG. 4 is a block diagram illustrating a motor rotation angle detecting device.

FIG. 1 is a structure view of a motor device having a resolver device according to a first embodiment. FIG. 2 is a cross-sectional view of the resolver device taken along a virtual plane orthogonal to an axial direction illustrated in FIG. 1. FIG. 3 is a connection diagram of exciting coils of the resolver device. FIG. 4 is a block diagram illustrating a motor rotation angle detecting device. A resolver device 1 and a motor 100 according to the first embodiment will be described with reference to FIGS. 1 to 4.

(First Embodiment)

The motor 100 illustrated in FIG. 1 is a motor device called a direct drive motor that transmits rotational force directly to an object to be driven. Since the direct drive motor transmits the rotational force directly to the object to be driven, friction loss is small and rotation efficiency can be improved. The motor 100 includes a motor body 2 and the resolver device 1.

As illustrated in FIG. 1, the motor body 2 includes a housing 25, a motor stator core 23, an exciting coil 24, a magnet 22, and a motor rotor 21. The motor body 2 is configured such that the motor rotor 21 is supported by a bearing 3 so as to be freely rotatable about a rotation center axis Zr with respect to the housing 25. The housing 25 is a hollow cylinder, the center of which is located on the rotation center axis Zr. The motor stator core 23 and an inner ring of the bearing 3 are fixed to an outer periphery of the housing 25. As a material that forms the housing 25, for example, a general steel material such as steel plate cold commercial (SPCC), electromagnetic soft iron, aluminum, and the like can be applied.

The exciting coil 24 is wound around the motor stator core 23 via an insulator. The motor stator core 23 is a cylindrical body and manufactured by laminating thin plates such as electromagnetic steel plates and cold rolled steel plates by means of adhesion, and usage of a boss, a swage, and the like. The exciting coil 24 is a linear electric wire capable of generating a rotating magnetic field by receiving power supply from a motor cable MC and exciting the motor stator core 23. The motor stator core 23 and the exciting coil 24 are so-called stators of the motor body 2.

The motor rotor 21 is a cylinder, the center of which is located on the rotation center axis Zr. The motor rotor 21 has a double cylinder structure so as to cover the outer periphery of the housing 25. The magnet 22 and an outer ring of the bearing 3 are fixed at an inner peripheral side of the motor rotor 21. As a material that forms the motor rotor 21, for example, a general steel material such as steel plate cold commercial (SPCC), electromagnetic soft iron, aluminum, and the like can be applied. The motor rotor 21 is configured such that the magnet 22 is stuck along an inner peripheral surface on the inside in a radial direction of the motor rotor 21, and a plurality of magnets 22 are provided in a circumferential direction. The magnet 22 is a permanent magnet, and the south poles and the north poles are arranged alternately at equal intervals in the circumferential direction of the motor rotor 21. Such a motor rotor 21 is called a permanent magnet (PM) rotor. The south pole and the north pole form a pair, and thus the number of pole pairs of the rotor is half the number of poles. The motor rotor 21 rotates in accordance with the rotating magnetic field of teeth of the motor stator core 23 excited by the exciting coil 24.

As illustrated in FIG. 1, the resolver device 1 is positioned at the end in the axial direction (direction parallel to the rotation center) of the motor body 2. The resolver device 1 includes a resolver rotor 14 and a resolver stator 13. The resolver rotor 14 is fixed to the motor rotor 21 by a bolt 15. The resolver stator 13 is fixed to the housing 25 of the motor body 2 via a bolt 16. The resolver rotor 14 has, on its end surface opposite to the motor body 2 side, a screw hole as a fixing part 33 capable of fixing the object to be driven. The resolver rotor 14 may include, on the end surface opposite to the motor body 2 side, a cover member 31 for dust protection. The cover member 31 is fixed to the resolver stator 13 by a bolt 32 or the like.

The resolver device 1 is configured such that the resolver rotor 14 is supported by the bearing 3 so as to be freely rotatable about the rotation center axis Zr with respect to the resolver stator 13. The resolver stator 13 has the same diameter as the housing 25, and is a hollow cylinder, the center of which is located on the rotation center axis Zr. The inner ring of the bearing 3 is fixed at an outer periphery of the resolver stator 13. As a material that forms the resolver stator 13, for example, a general steel material such as steel plate cold commercial (SPCC), electromagnetic soft iron, aluminum, and the like can be applied.

The resolver rotor 14 is a cylinder, the center of which is located on the rotation center axis Zr. The resolver rotor 14 has a double cylinder structure so as to cover the outer periphery of the resolver stator 13. The outer ring of the bearing 3 is fixed at an inner peripheral side of the resolver rotor 14. As a material that forms the resolver rotor 14, for example, a general steel material such as steel plate cold commercial (SPCC), electromagnetic soft iron, aluminum, and the like can be applied. This structure allows the exciting coil 24 of the motor stator core 23 to be excited and the motor rotor 21 to be rotationally driven, whereby the resolver rotor 14 is rotationally driven with respect to the resolver stator 13 at the same time. As a result, in accordance with the rotation of the resolver rotor 14, the motor 100 can rotate the object to be driven that is fixed to the fixing part 33.

A shielding plate for magnetic shielding may be provided between the resolver device 1 and the motor body 2. The shielding plate allows the resolver device 1 to be hardly affected by a change in a magnetic flux from the motor body 2.

As illustrated in FIG. 1, the resolver rotor 14 has an annular rotor core 12, and fixes the rotor core 12 to its end surface with a bolt 18.

The resolver stator 13 has an annular stator core 11 on which a plurality of magnetic poles are formed at equal intervals in a circumferential direction. A resolver coil is wound around each magnetic pole. The stator core 11 is fixed to an end surface of the resolver stator 13 by a bolt 17. Wiring to which an excitation signal is input and wiring that outputs a resolver current signal are connected to each resolver coil via a resolver cable RC.

The rotor core 12 surrounds an outer periphery of the stator core 11, and is arranged on the same plane orthogonal to the rotation center axis Zr on which the stator core 11 is arranged. When the rotor core 12 rotates around the stator core 11, a distance of an air gap between the stator core 11 at a tip position with a specific magnetic pole and the rotor core 12 changes. As a result, the rotation of the rotor core 12 changes reluctance between the rotor core 12 and the stator core 11. The resolver device 1 that detects a rotation position using the change in the reluctance between the rotor core 12 and the stator core 11 is called a variable reluctance resolver. In the resolver device 1 of the first embodiment, the rotor core 12 has 10 rotor teeth projecting to a side facing the stator core 11, and a fundamental wave component generated in one rotation of the rotor core 12 corresponds to ten periods. The rotor core 12 is not limited to an outer rotor, and only needs to be configured such that a reluctance component of a gap between the rotor core 12 and the stator core 11 changes in accordance with a relative angle position to the stator core 11. The rotor core 12 may be such an inner rotor that the stator core 11 surrounds an outer periphery of the rotor core 12.

An inner diameter center of the rotor core 12 coincides with an inner diameter center of the stator core 11 of the resolver stator 13 which will be described below. When the rotor core 12 rotates, a distance between an outer diameter of the stator core 11 of the resolver stator 13 at a predetermined position and an inner diameter of the rotor core 12 changes. Consequently, an air gap between the inner diameter of the rotor core 12 and the stator core 11 changes. As a result, the rotation of the rotor core 12 changes the reluctance between the rotor core 12 and the stator core 11. The resolver device that detects the rotation position using the change in the reluctance between the rotor core 12 and the stator core 11 is called the variable reluctance resolver.

The stator core 11 includes a plurality of stator main poles A1, A2, B1, B2, C1, and C2 and a plurality of stator interpoles IA1, IA2, IB1, IB2, IC1, and IC2 which are salient poles projecting toward the rotor core 12 along a circumferential direction of a ring-shaped stator base.

The stator core 11 has the three-phase stator main poles (main magnetic poles) A1, B1, and C1 for an A phase, a B phase, and a C phase, respectively. The stator main poles A1, B1, and C1 are configured such that respective wound exciting coils L2, L10, and L6 are arranged at intervals of an electrical angle of 120° along the circumferential direction of the ring-shaped stator base. The exciting coils L2, L10, and L6 are respectively wound around the stator main poles A1, B1, and C1 in the same direction. In the stator core 11, the stator main poles A2, B2, and C2 respectively for the A phase, the B phase, and the C phase are arranged at positions shifted by an electrical angle of 180° with respect to the respective three-phase stator main poles A1, B1, and C1 for the A phase, the B phase, and the C phase. The number of the stator main poles A1, B1, C1, A2, B2, and C2 is an even multiple of three that is the number of phases, i.e., six. The exciting coil L2 is wound around the stator main pole A1, and an exciting coil L8 is wound around the stator main pole A2 in the same direction as the exciting coil L2. The exciting coil L10 is wound around the stator main pole B1, and an exciting coil L4 is wound around the stator main pole B2 in the same direction as the exciting coil L10. The exciting coil L6 is wound around the stator main pole C1, and an exciting coil L12 is wound around the stator main pole C2 in the same direction as the exciting coil L6.

The A-phase stator interpoles IA1 and IA2 are arranged at positions shifted by an electrical angle of +90 degrees or an electrical angle of −90 degrees with respect to at least one of the corresponding A-phase stator main poles A1 and A2. An exciting coil L1 is wound around the stator interpole IA1 in the reverse winding direction of the exciting coil L2. An exciting coil L7 is wound around the stator interpole IA2 in the same winding direction as the exciting coil L1 and in the reverse winding direction of the exciting coil L8. The stator core 11 is configured such that the stator interpole IA2 is arranged at a position shifted by an electrical angle of 180° with respect to the stator interpole IA1.

The B-phase stator interpoles IB1 and IB2 are arranged at positions shifted by an electrical angle of +90 degrees or an electrical angle of −90 degrees with respect to at least one of the corresponding B-phase stator main poles B1 and B2. An exciting coil L9 is wound around the stator interpole IB1 in the reverse winding direction of the exciting coil L10. An exciting coil L3 is wound around the stator interpole IB2 in the same winding direction as the exciting coil L9 and in the reverse winding direction of the exciting coil L4. The stator core 11 is configured such that the stator interpole IB2 is arranged at a position shifted by an electrical angle of 180° with respect to the stator interpole IB1.

The C-phase stator interpoles IC1 and IC2 are arranged at positions shifted by an electrical angle of +90 degrees or an electrical angle of −90 degrees with respect to at least one of the corresponding C-phase stator main poles C1 and C2. An exciting coil L5 is wound around the stator interpole IC1 in the reverse winding direction of the exciting coil L6. An exciting coil L11 is wound around the stator interpole IC2 in the same winding direction as the exciting coil L5 and in the reverse winding direction of the exciting coil L12. The stator core 11 is configured such that the stator interpole IC2 is arranged at a position shifted by an electrical angle of 180° with respect to the stator interpole IC1.

FIG. 3 is a connection diagram of the exciting coils. As illustrated in FIG. 3, a one-phase excitation input signal is applied, as an excitation signal of a sine wave of a frequency, from a common terminal COM to each of the exciting coils L2, L6, and L10. The respective exciting coils L1, L2, L3, L4, L5, L6, L7, L8, L9, L10, L11, and L12 are connected in series to current detecting resistors R1, R2, and R3 for each of the A phase, the B phase, and the C phase. For example, the A-phase exciting coils L2, L1, L8, and L7 are connected in series. The B-phase exciting coils L10, L9, L4, and L3 are also connected in series. Furthermore, the C-phase exciting coils L6, L5, L12, and L11 are connected in series. The A-phase exciting coil L7 is connected to one end of the current detecting resistor R1. The B-phase exciting coil L3 is connected to one end of the current detecting resistor R2. The C-phase exciting coil L11 is connected to one end of the current detecting resistor R3. Respective other ends of the current detecting resistors R1, R2, and R3 are grounded internally.

In the resolver device 1, when a sine wave of a certain frequency is applied to the common terminal COM as an excitation signal, at an electrical angle θ generated by movement of a rotor tooth upon the rotation of the rotor core 12, a one-cycle AC signal that is a resolver current signal having a current value changed in accordance with a change in the reluctance is output to a current voltage converter 41.

FIG. 4 is a block diagram illustrating the motor device. For example, as illustrated in FIG. 4, a motor device 10 includes the resolver device 1, the motor body 2, and a drive unit 60. The drive unit 60 is coupled to the resolver device 1 of the motor 100 by the resolver cable RC. The drive unit 60 is coupled to the motor body 2 of the motor 100 by the motor cable MC.

The drive unit 60 has a resolver excitation circuit 50, an oscillation circuit 51, a detection circuit part 40, an operation device 61, and a power amplifier 62. The resolver excitation circuit 50 and the oscillation circuit 51 supply an excitation signal to the resolver device 1. The detection circuit part 40 acquires a responding resolver current signal and outputs a digital angle signal Rs. The operation device 61 generates a rotation angle position signal from the digital angle signal Rs. The power amplifier 62 supplies power to the motor body 2 based on a command Sfb from the operation device 61.

The oscillation circuit 51 is a circuit that oscillates a standard signal. The standard signal is, for example, a sine wave. The resolver excitation circuit 50 includes an amplifier 52. The resolver excitation circuit 50 generates an excitation signal by the amplifier 52 amplifying the standard signal output from the oscillation circuit 51 to a signal of more appropriate level. The excitation signal is, for example, a sine wave analog signal. The resolver excitation circuit 50 outputs the excitation signal to the common terminal COM.

The common terminal COM outputs the excitation signal to the resolver device 1 via the resolver cable RC. In the resolver device 1, as illustrated in FIG. 3, the common terminal COM supplies, as an input signal, the excitation signal to one end of each of the exciting coils L2, L6, and L10.

When the excitation signal as the input signal is supplied to the resolver device 1, a resolver current signal is supplied from each of other ends of the respective exciting coils L3, L7, and L11 illustrated in FIG. 3 to the detection circuit part 40 via the resolver cable RC.

In the resolver device 1, when a sine wave of a certain frequency is applied to the common terminal COM as an excitation signal, during one rotation of the rotor core 12, an A-phase one-cycle AC signal that is a resolver current signal having a current value changed in accordance with a change in the reluctance is output from each of the exciting coils L1, L7 to the current voltage converter 41.

In the resolver device 1, when a sine wave of a certain frequency is applied to the common terminal COM as an excitation signal, during one rotation of the rotor core 12, a B-phase one-cycle AC signal that is a resolver current signal having a current value changed in accordance with a change in the reluctance is output from each of the exciting coils L3, L9 to the current voltage converter 41.

In the resolver device 1, when a sine wave of a certain frequency is applied to the common terminal COM as an excitation signal, during one rotation of the rotor core 12, a C-phase one-cycle AC signal that is a resolver current signal having a current value changed in accordance with a change in the reluctance is output from each of the exciting coils L11, L5 to the current voltage converter 41.

The A-phase one-cycle AC signal that is a resolver current signal having a current value changed in accordance with a change in the reluctance is shifted in phase by an electrical angle of 120° with respect to the B-phase and C-phase one-cycle AC signals, each of which is a resolver current signal having a current value changed in accordance with a change in the reluctance.

The current voltage converter 41 of the detection circuit part 40 converts the resolver current signal to a resolver voltage signal. The converted resolver voltage signal is supplied to a three-phase/two-phase converter 42.

The three-phase/two-phase converter 42 converts the supplied resolver voltage signal to two-phase signals (sin signal Ssin, cos signal Scos).

Figure 5:
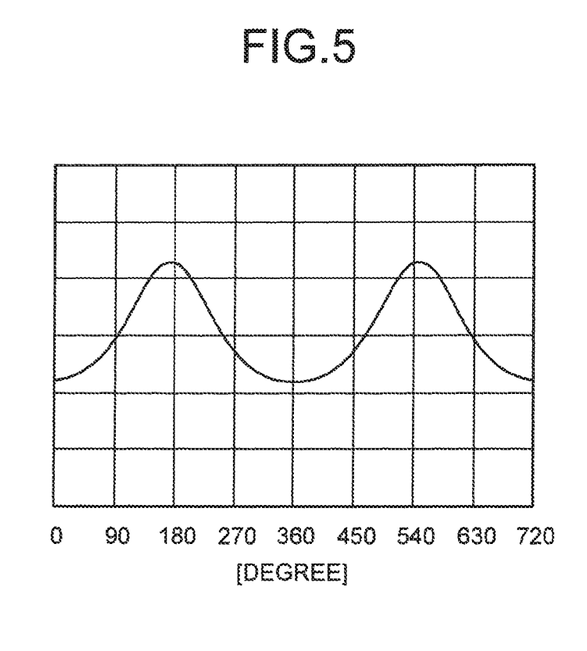
FIG. 5 is a diagram illustrating an example of a C-phase resolver voltage signal obtained in a current voltage converter.
Figure 6:
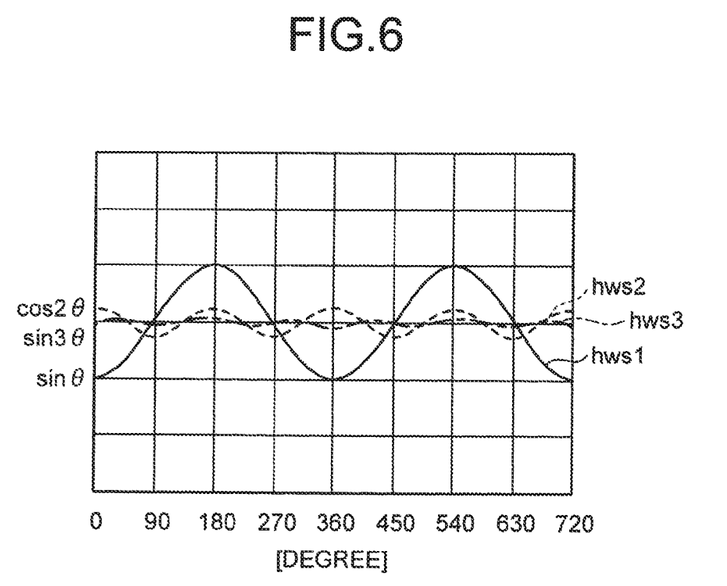
FIG. 6 is a diagram for explaining the C-phase resolver voltage signal obtained in the current voltage converter illustrated in FIG. 5, separated into a fundamental wave, a second harmonic wave, and a third harmonic wave.

For example, a resolver voltage signal for each phase obtained in the current voltage converter 41 might include a higher-order component. FIG. 5 is a diagram illustrating an example of a C-phase resolver voltage signal obtained in the current voltage converter. A vertical axis is a voltage, and a horizontal axis is a rotation angle of a fundamental wave component. FIG. 6 is a diagram for explaining the C-phase resolver voltage signal obtained in the current voltage converter illustrated in FIG. 5, separated into a fundamental wave, a second harmonic wave, and a third harmonic wave. As illustrated in FIG. 6, the fundamental wave hws1 is a sin θ curve, the second harmonic wave hws2 is a cos 2θ curve, and the third harmonic wave hws3 is a sin 3θ curve.

When the second harmonic wave described below is superimposed on the fundamental wave, the stator main poles C1 and C2 output a main pole signal SM of the C-phase resolver voltage signal represented by Equation (2).

$$SM = \sin\theta - \cos 2\theta \quad (2)$$

In this case, when the same second harmonic wave is superimposed on the fundamental wave, the stator interpoles IC1 and IC2 output an interpole signal SI of the C-phase resolver voltage signal represented by Equation (3).

$$SI = \sin\left(\theta - \frac{\pi}{2}\right) - \cos 2\left(\theta - \frac{\pi}{2}\right) \quad (3)$$

Therefore, when the main pole signal SM and the interpole signal SI of the C-phase resolver voltage signal obtain a C-phase resolver signal S that is a composite component, the second harmonic wave is cancelled as represented by the following Equation (4).

$$\begin{aligned}
S &= SM = SI \quad (4)\\
&= \sin\theta - \cos 2\theta + \sin\left(\theta - \frac{\pi}{2}\right) - \cos 2\left(\theta - \frac{\pi}{2}\right)\\
&= \sin\theta - (1 - 2\sin^2\theta) - \cos\theta - (2\sin^2\theta - 1)\\
&= \sin\theta - \cos\theta\\
&= \sqrt{2}\left(\sin\theta \cdot \frac{1}{\sqrt{2}} - \cos\theta \cdot \frac{1}{\sqrt{2}}\right)\\
&= \sqrt{2}\left(\sin\theta\cos\frac{\pi}{4} - \cos\theta\sin\frac{\pi}{4}\right)\\
&= \sqrt{2}\sin\left(\theta - \frac{\pi}{4}\right)
\end{aligned}$$

Figure 7:
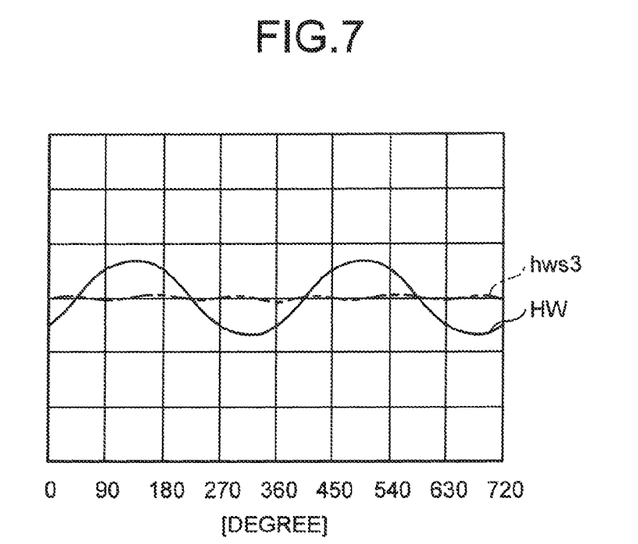
FIG. 7 is a diagram for explaining the C-phase resolver voltage signal obtained in the current voltage converter illustrated in FIG. 5, with the second harmonic wave thereof suppressed, separated into the fundamental wave and the third harmonic wave.

Although the explanation has been given to the C phase, the second harmonic wave is cancelled for each of the B phase and the A phase as well. FIG. 7 is a diagram for explaining the C-phase resolver voltage signal obtained in the current voltage converter illustrated in FIG. 5, with the second harmonic wave thereof suppressed, separated into a composite wave of the C-phase resolver signal and the third harmonic wave. In the C-phase resolver voltage signal of the resolver device 1 according to the first embodiment, the third harmonic wave is superimposed on the composite wave HW of the C-phase resolver signal S illustrated in FIG. 7 instead of the fundamental wave hws1, the second harmonic wave hws2, and the third harmonic wave hws3 illustrated in FIG. 6.

In the resolver device 1 according to the first embodiment, the B phase and the A phase are each delayed by 120 degrees with respect to the C phase. As mentioned above, when the third harmonic wave is superimposed on the composite wave HW of the C-phase resolver signal S illustrated in FIG. 7, three-phase resolver signals SA, SB, and SC on which the third harmonic wave is superimposed can be represented by the following Equation (5), Equation (6), and Equation (7).

$$SC = \sin\theta - \sin 3\theta \quad (5)$$

$$SB = \sin\left(\theta - \frac{2}{3}\pi\right) - \sin 3\left(\theta - \frac{2}{3}\pi\right) \quad (6)$$

$$SA = \sin\left(\theta - \frac{4}{3}\pi\right) - \sin 3\left(\theta - \frac{4}{3}\pi\right) \quad (7)$$

Among the two-phase signals obtained in the three-phase/two-phase converter 42, the cos signal Scos can be obtained by Equation (8) based on Equation (5), Equation (6), and Equation (7).

$$\begin{aligned}
S\cos &= SC - \frac{1}{2}(SB + SA) \quad (8)\\
&= (\sin\theta - \sin 3\theta) - \frac{1}{2}\left\{\sin\left(\theta - \frac{2}{3}\pi\right) - \sin 3\left(\theta - \frac{2}{3}\pi\right) + \right.\\
&\quad \left. \sin\left(\theta - \frac{4}{3}\pi\right) - \sin 3\left(\theta - \frac{4}{3}\pi\right)\right\}
\end{aligned}$$

Referring to the following Equations (9) to (12), Equation (8) can be calculated by the following Equation (13).

$$\sin\left(\theta - \frac{2}{3}\pi\right) = -\frac{1}{2}\sin\theta - \frac{\sqrt{3}}{2}\cos\theta \quad (9)$$

$$\sin\left(\theta - \frac{4}{3}\pi\right) = -\frac{1}{2}\sin\theta - \frac{\sqrt{3}}{2}\cos\theta \quad (10)$$

$$\sin 3\left(\theta - \frac{2}{3}\pi\right) = \sin(3\theta - 2\pi) = \sin 3\theta \quad (11)$$

$$\sin 3\left(\theta - \frac{4}{3}\pi\right) = \sin(3\theta - 4\pi) = \sin 3\theta \quad (12)$$

$$\begin{aligned}
S\cos &= (\sin\theta - \sin 3\theta) - \frac{1}{2}\left\{\left(-\frac{1}{2}\sin\theta - \frac{\sqrt{3}}{2}\cos\theta - \sin 3\theta\right) + \right.\\
&\quad \left. \left(-\frac{1}{2}\sin\theta + \frac{\sqrt{3}}{2}\cos\theta - \sin 3\theta\right)\right\}\\
&= (\sin\theta - \sin 3\theta) - \frac{1}{2}(-\sin\theta - 2\sin 3\theta)\\
&= \sin\theta - \sin 3\theta + \frac{1}{2}\sin\theta + \sin 3\theta\\
&= \frac{3}{2}\sin\theta
\end{aligned} \quad (13)$$

As clearly understood from Equation (13), the third harmonic wave is cancelled in the cos signal Scos.

Similarly, referring to the above-mentioned Equations (6) to (12), among the two-phase signals obtained by the three-phase/two-phase converter 42, the third harmonic wave is cancelled in the sin signal Ssin as clearly understood from Equation (14).

$$\begin{aligned}
S\sin &= \frac{\sqrt{3}}{2}(SB - SA) \quad (14)\\
&= \frac{\sqrt{3}}{2}\left\{\left(\sin\left(\theta - \frac{2}{3}\pi\right) - \sin 3\left(\theta - \frac{2}{3}\pi\right)\right) - \right.\\
&\quad \left. \left(\sin\left(\theta - \frac{4}{3}\pi\right) - \sin 3\left(\theta - \frac{4}{3}\pi\right)\right)\right\}\\
&= \frac{\sqrt{3}}{2}\left\{\left(-\frac{1}{2}\sin\theta - \frac{\sqrt{3}}{2}\cos\theta - \sin 3\theta\right) - \right.\\
&\quad \left. \left(-\frac{1}{2}\sin\theta + \frac{\sqrt{3}}{2}\cos\theta - \sin 3\theta\right)\right\}\\
&= \frac{\sqrt{3}}{2}\left(-\frac{\sqrt{3}}{2}\cos\theta - \frac{\sqrt{3}}{2}\cos\theta\right)\\
&= -\frac{3}{2}\cos\theta
\end{aligned}$$

As illustrated in FIG. 4, the two-phase signals (sin signal Ssin, cos signal Scos) converted by the three-phase/two-phase converter 42 are supplied to a resolver digital converter (RDC) 44. A phase shifter 45 supplies, to the RDC 44, a reference signal (Ref signal) synchronized with a phase of the standard signal output from the oscillation circuit 51. The RDC 44 digitizes the two-phase signals (sin signal Ssin, cos signal Scos) and outputs the digitized two-phase signals to the operation device 61.

The operation device 61 is a computer and includes, for example, a central processing unit (CPU), a read only memory (ROM), a random access memory (RAM), an internal storage unit, an input interface, and an output interface. The CPU, the ROM, the RAM, and the internal storage unit are coupled to one another by an internal bus. A program such as a BIOS is stored in the ROM. The internal storage unit is, for example, a hard disk drive (HDD), a flash memory or the like, and stores therein an operating system program or an application program. The CPU realizes various functions by executing the program stored in the ROM or the internal storage unit while using the RAM as a work area.

Figure 8:
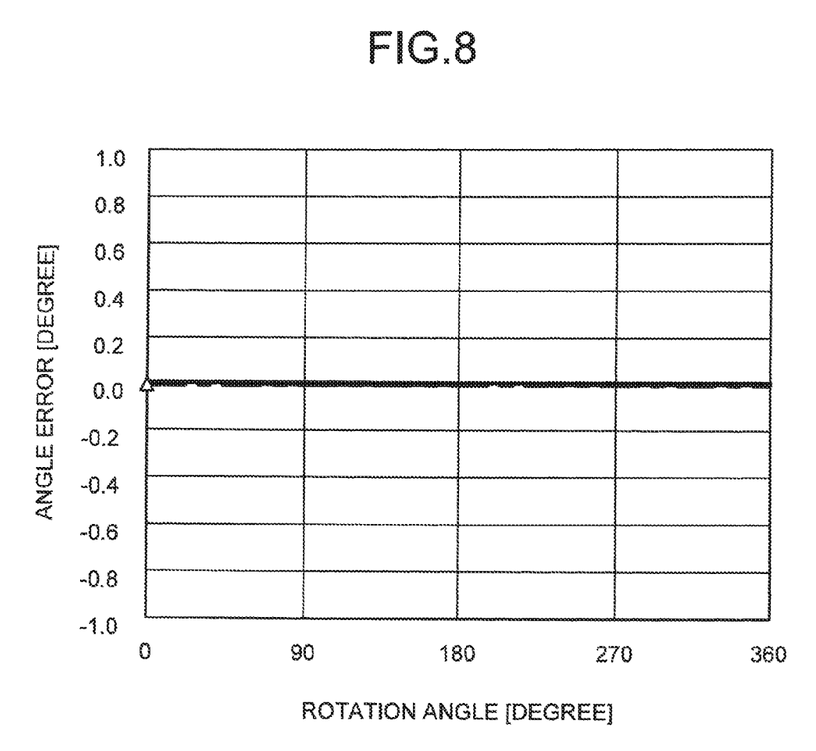
FIG. 8 is a diagram for explaining an angle error of the resolver device according to the first embodiment.
Figure 9:
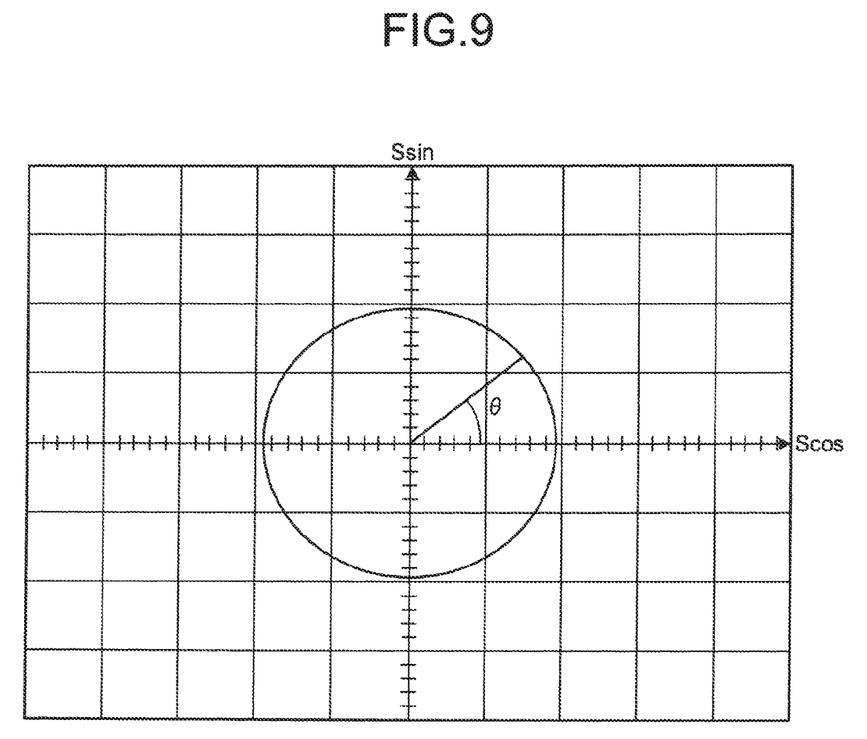
FIG. 9 is a diagram of a Lissajous waveform for explaining an angle operation of the resolver device according to the first embodiment.

The operation device 61 acquires the digital angle signal Rs to compute a rotation angle position of the motor body 2. The operation device 61 can calculate an arc tangent (inverse tangent function) of the two-phase signals (sin signal Ssin, cos signal Scos) converted by the three-phase/two-phase converter 42 to obtain an angle θ. FIG. 8 is a diagram for explaining an angle error of the resolver device according to the first embodiment. As illustrated in FIG. 8, the resolver device 1 according to the first embodiment can significantly reduce the angle error of the angle θ since the second harmonic wave and the third harmonic wave are cancelled. FIG. 9 is a diagram of a Lissajous waveform for explaining an angle operation of the resolver device according to the first embodiment. In this manner, the RDC 44 can calculate the arc tangent (inverse tangent function) of the two-phase signals (sin signal Ssin, cos signal Scos) converted by the three-phase/two-phase converter 42 to calculate the angle θ of the Lissajous waveform illustrated in FIG. 9. Based on information of the angle θ, the operation device 61 sends, to the power amplifier 62, the command Sfb to supply power to the motor body 2.

The processing to obtain the digital angle signal Rs from the resolver signal is not necessarily performed in a hardware circuit (RDC 44). Alternatively, the operation device 61 may subject the resolver signal to an A/D conversion to obtain the information of the angle θ through information processing using software.

As mentioned above, the resolver device 1 includes the stator core 11 and the rotor core 12 supported by the bearing 3 so as to be freely rotatable with respect to the stator core 11 and configured such that the reluctance component of the gap between the rotor core 12 and the stator core 11 changes in accordance with the relative angle position to the stator core 11. The stator core 11 includes the stator main poles A1, A2, B1, B2, C1, and C2 and the stator interpoles IA1, IA2, IB1, IB2, IC1, and IC2. The number of the stator main poles A1, A2, B1, B2, C1, and C2 is an even multiple of three that is the number of phases, i.e., six. The stator main poles A1, A2, B1, B2, C1, and C2 are arranged along the circumferential direction of the ring-shaped stator base such that the respective wound excitation coils output, in response to the one-phase excitation input signal, three-phase output signals each shifted by an electrical angle of +120 degrees or an electrical angle of −120 degrees. The stator interpoles IA1, IA2, IB1, IB2, IC1, and IC2 are each arranged at a position where the one-phase input signal is input to each of the wound exciting coils and the second harmonic wave is suppressed with respect to the output signal for each phase along the circumferential direction of the ring-shaped stator base. In other words, the stator interpoles IA1, IA2, IB1, IB2, IC1, and IC2 are arranged at positions shifted by an electrical angle of +90 degrees or an electrical angle of −90 degrees with respect to at least one of the corresponding stator main poles for the respective phases. The stator interpoles IA1, IA2, IB1, IB2, IC1, and IC2 for the respective phases add output of the respective wound exciting coils for the stator interpoles IA1, IA2, IB1, IB2, IC1, and IC2 for the respective phases to the output signals of the corresponding stator main poles A1, A2, B1, B2, C1, and C2 for the respective phases to compose the three-phase resolver signals SA, SB, and SC. The three-phase resolver signals SA, SB, and SC are then subjected to the three-phase/two-phase conversion to obtain the two-phase resolver signals, i.e., the sin signal Ssin and the cos signal Scos.

As illustrated in FIG. 2, the rotor core 12 includes the rotor teeth Q1 to Q10 projecting to the side facing the stator core 11. Assuming that the number of main poles P is six and the number of rotor teeth q is ten, the following Equation (15) is satisfied.

$$P = (q/(M+(N\pm1)/N)) \tag{15}$$

In Equation (15), N is three that is the number of phases, and M is one, for example, that is an integer variable satisfying Equation (15).

As mentioned above, the number of stator main poles constituting the three-phase resolver is a multiple of three and an even number. The reason why the number of main poles is always an even number is because when the stator main poles and the stator interpoles are combined, the winding directions of the respective exciting coils become in the order of a clockwise winding (CW) direction, a counterclockwise winding (CCW) direction, the CW direction, the CCW direction, . . . in an alternate manner for the respective stator main poles and stator interpoles. Phases of the adjacent stator main poles of the resolver stator need to be ±120° (±⅓ pitch), and phases of the adjacent stator main pole and stator interpole of the resolver stator need to be ±90° (±¼ pitch). Under this condition, the number of main poles P and the number of rotor teeth q are defined by the above-mentioned Equation (15). As a result, the resolver device 1 of the first embodiment can increase the degree of freedom in the number of rotor teeth and improve positioning accuracy without reaching the limit in the number of main poles. A ripple in the resolver device 1 might affect vibration that occurs when the rotor is accelerated or decelerated, or rotates at a constant speed. However, the occurrence of the ripple can be suppressed since detection accuracy of the resolver device 1 is improved. As a result, vibration of the resolver device 1 and the motor 100 can be reduced. Furthermore, the improved accuracy allows the motor 100 to reduce noise during the driving of the motor caused by a detection error. The resolver device 1 can also reduce the number of main poles and the number of interpoles of the stator core. As a result, a resolver winding method can be simplified, and the uniform winding allows the resolver device 1 to minimize imbalance among the three phases of the resolver signals.

The resolver device 1 of the first embodiment is suitable for a control device having the small motor 100 that is capable of performing accurate positioning and that is used in, for example, an index table of an NC machine tool, a conveying device, and a robot arm of an assembling device.

In the motor 100, since the rotor core 12 of the resolver device 1 rotates in conjunction with the motor rotor 21, the rotation of the motor rotor 21 is detected by the resolver device 1. Since the number of rotor teeth q of the resolver device 1 is ten, the number of pole pairs of the motor 100 is preferably ten. This structure allows the number of electrical cycles per rotation of the rotor core 12 of the resolver device 1 to coincide with the number of pole pairs of the motor, thereby facilitating commutation for controlling motor driving current.

The motor 100 of the first embodiment has been described using the direct drive motor as an example. However, the resolver device 1 according to the first embodiment can be applied to detection of rotation of a drive mechanism in an actuator that operates a driven mechanism via a transmission mechanism such as a ball screw mechanism that converts rotation to linear motion. The resolver device 1 according to the first embodiment can also be applied to detection of rotation of a drive mechanism in an actuator that operates a driven mechanism via a transmission mechanism such as a gear mechanism that changes the number of rotations of the motor rotor 21 of the motor body 2.

(Second Embodiment)

Figure 10:
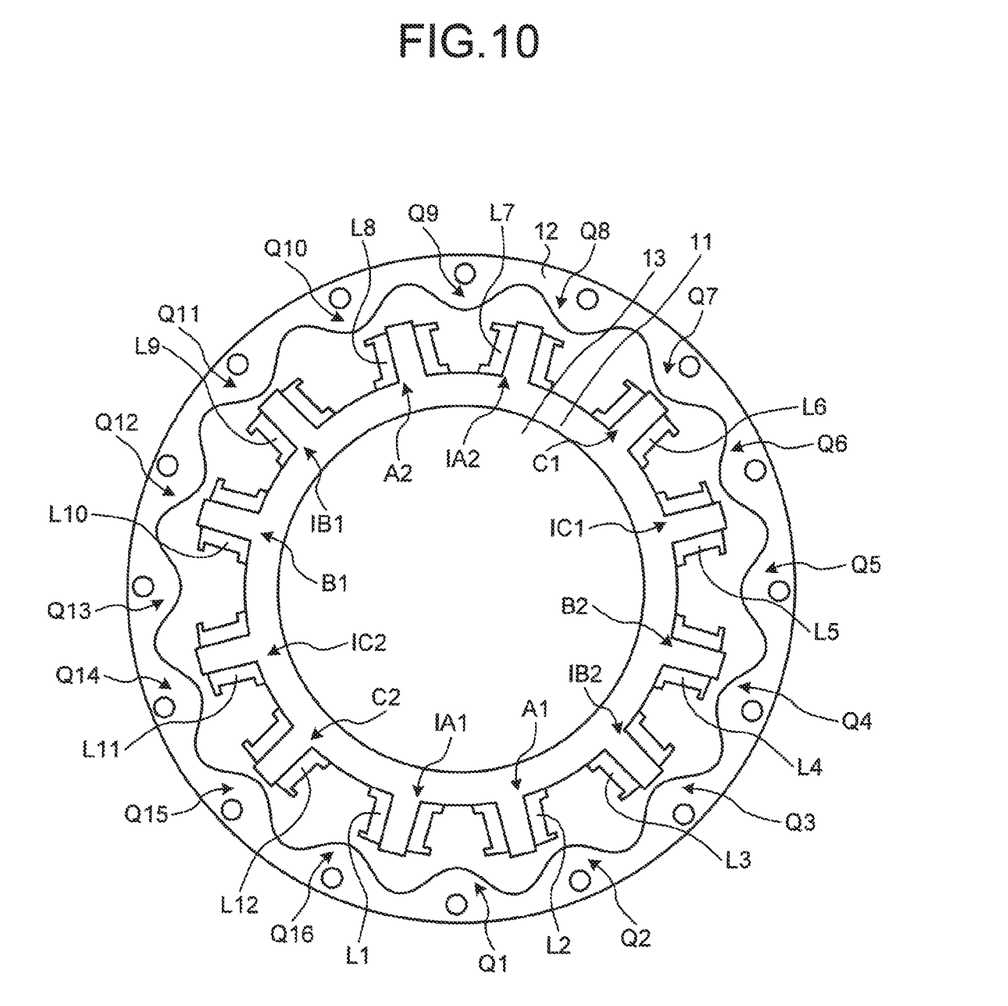
FIG. 10 is a cross-sectional view of a resolver device according to a second embodiment taken along the virtual plane orthogonal to the axial direction illustrated in FIG. 1.

FIG. 10 is a cross-sectional view of a resolver device according to a second embodiment taken along the virtual plane orthogonal to the axial direction illustrated in FIG. 1. Components that are the same as those of the above-mentioned first embodiment are denoted by the same reference signs, and overlapping explanations will be omitted. The resolver device of the second embodiment is different from the resolver device 1 of the first embodiment in the number of rotor teeth of the rotor core 12.

As illustrated in FIG. 10, the rotor core 12 includes the rotor teeth Q1 to Q16 projecting to the side facing the stator core. Assuming that the number of main poles P is six and the number of rotor teeth q is sixteen, the following Equation (16) is satisfied.

$$P=(q/(M+(N\pm 1)/N)) \quad (16)$$

In the formula, N is three that is the number of phases, and M is two, for example, that is an integer variable satisfying Equation (16).

When the number of main poles P and the number of rotor teeth q satisfy the above-mentioned Equation (16), the degree of freedom in the number of rotor teeth can be increased.

The resolver device of the second embodiment is suitable for a control device having the small motor 100 that is capable of performing accurate positioning and that is used in, for example, an index table of an NC machine tool, a conveying device, and a robot arm of an assembling device. In the motor 100, since the rotor core 12 of the resolver device rotates in conjunction with the motor rotor 21, the rotation of the motor rotor 21 is detected by the resolver device. Since the number of rotor teeth q of the resolver device is sixteen, the number of pole pairs of the motor 100 is preferably sixteen. This structure allows the number of electrical cycles per rotation of the rotor core 12 of the resolver device to coincide with the number of pole pairs of the motor, thereby facilitating commutation for controlling motor driving current.

(Third Embodiment)

Figure 11:
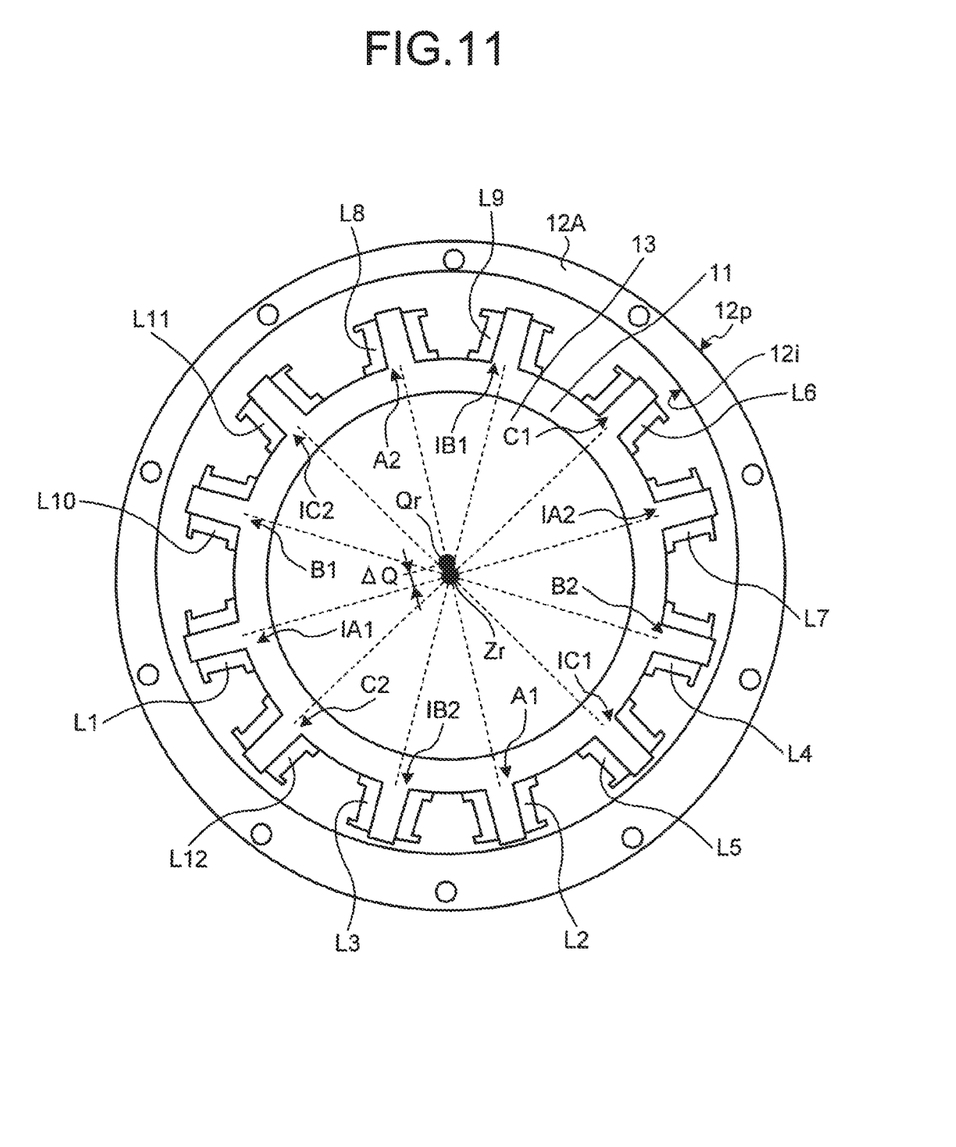
FIG. 11 is a cross-sectional view of a resolver device according to a third embodiment taken along the virtual plane orthogonal to the axial direction illustrated in FIG. 1.

FIG. 11 is a cross-sectional view of a resolver device according to a third embodiment taken along the virtual plane orthogonal to the axial direction illustrated in FIG. 1. Components that are the same as those of the above-mentioned first embodiment are denoted by the same reference signs, and overlapping explanations will be omitted. The resolver device of the third embodiment is different from the resolver device 1 of the first embodiment in the number of rotor teeth of the rotor core 12.

As illustrated in FIG. 11, a rotor core 12A is configured such that a center Qr of an inner diameter 12$i$ is shifted by $\Delta Q$ from a center Zr of an outer diameter 12$p$. This structure allows an air gap between an outer diameter of the rotor core 12A and the stator core 11 to change. As a result, the rotation of the rotor core 12A changes reluctance between the rotor core 12A and the stator core 11. In the resolver device 1 of the third embodiment, a fundamental wave component generated in one rotation of the rotor core 12A corresponds to one period, and the number of rotor teeth q is equivalent to one.

An outer diameter center of the rotor core 12A coincides with an inner diameter center of the stator core 11 of the resolver stator 13 which will be described below. When the rotor core 12A rotates, a distance between an outer diameter of the stator core 11 of the resolver stator 13 at a predetermined position and the inner diameter of the rotor core 12A changes. Consequently, the air gap between the inner diameter of the rotor core 12A and the stator core 11 changes. As a result, the rotation of the rotor core 12A changes the reluctance between the rotor core 12A and the stator core 11. The resolver device that detects a rotation position using the change in the reluctance between the rotor core 12A and the stator core 11 is called a variable reluctance resolver.

The stator core 11 includes a plurality of stator main poles A1, A2, B1, B2, C1, and C2 and a plurality of stator interpoles IA1, IA2, IB1, IB2, IC1, and IC2 that are salient poles projecting toward the rotor core 12 along a circumferential direction of a ring-shaped stator base. Hereinafter, the resolver device of the third embodiment will be described with reference to FIGS. 3 and 11.

The stator core 11 has the three-phase stator main poles (main magnetic poles) A1, B1, and C1 respectively for an A phase, a B phase, and a C phase. The stator main poles A1, B1, and C1 are configured such that respective wound exciting coils L2, L10, and L6 are arranged at intervals of a mechanical angle of 120° along the circumferential direction of the ring-shaped stator base. The exciting coils L2, L10, and L6 are respectively wound around the stator main poles A1, B1, and C1 in the same direction. The stator core 11 is provided with the stator main poles A2, B2, and C2 respectively for the A phase, the B phase, and the C phase arranged at positions shifted by a mechanical angle of 180° with respect to the respective three-phase stator main poles A1, B1, and C1 for the A phase, the B phase, and the C phase. The number of main poles of the stator main poles A1, B1, C1, A2, B2, and C2 is an even multiple of three that is the number of phases, i.e., six. The exciting coil L2 is wound around the stator main pole A1, and an exciting coil L8 is wound around the stator main pole A2 in the same direction as the exciting coil L2. The exciting coil L10 is wound around the stator main pole B1, and an exciting coil L4 is wound around the stator main pole B2 in the same direction as the exciting coil L10. The exciting coil L6 is wound around the stator main pole C1, and an exciting coil L12 is wound around the stator main pole C2 in the same direction as the exciting coil L6.

The A-phase stator interpoles IA1 and IA2 are arranged at positions shifted by a mechanical angle of +90 degrees or a mechanical angle of −90 degrees with respect to at least one of the corresponding A-phase stator main poles A1 and A2. As mentioned above, since the fundamental wave component generated in one rotation of the rotor core 12A corresponds to one period, and the number of rotor teeth q is equivalent to one, the A-phase stator interpoles IA1 and IA2 are arranged at positions shifted by a mechanical angle of +90 degrees or a mechanical angle of −90 degrees with respect to at least one of the corresponding A-phase stator main poles A1 and A2. An exciting coil L1 is wound around the stator interpole IA1 in the reverse winding direction of the exciting coil L2. An exciting coil L7 is wound around the stator interpole IA2 in the same winding direction as the exciting coil L1 and in the reverse winding direction of the exciting coil L8. The stator core 11 is configured such that the stator interpole IA2 is arranged at a position shifted by a mechanical angle of 180° with respect to the stator interpole IA1.

The B-phase stator interpoles IB1 and IB2 are arranged at positions shifted by a mechanical angle of +90 degrees or a mechanical angle of −90 degrees with respect to at least one of the corresponding B-phase stator main poles B1 and B2. As mentioned above, since the fundamental wave component generated in one rotation of the rotor core 12A corresponds to one period, and the number of rotor teeth q is equivalent to one, the B-phase stator interpoles IB1 and IB2 are arranged at positions shifted by a mechanical angle of +90 degrees or a mechanical angle of −90 degrees with respect to at least one of the corresponding B-phase stator main poles B1 and B2. An exciting coil L9 is wound around the stator interpole IB1 in the reverse winding direction of the exciting coil L10. An exciting coil L3 is wound around the stator interpole IB2 in the same direction as the exciting coil L9 and in the reverse winding direction of the exciting coil L4. The stator core 11 is configured such that the stator interpole IB2 is arranged at a position shifted by a mechanical angle of 180° from the stator interpole IB1.

The C-phase stator interpoles IC1 and IC2 are arranged at positions shifted by a mechanical angle of +90 degrees or a mechanical angle of −90 degrees with respect to at least one of the corresponding C-phase stator main poles C1 and C2. As mentioned above, since the fundamental wave component generated in one rotation of the rotor core 12A corresponds to one period, and the number of rotor teeth q is equivalent to one, the C-phase stator interpoles IC1 and IC2 are arranged at positions shifted by a mechanical angle of +90 degrees or a mechanical angle of −90 degrees with respect to at least one of the corresponding C-phase stator main poles C1 and C2. An exciting coil L5 is wound around the stator interpole IC1 in the reverse winding direction of the exciting coil L6. An exciting coil L11 is wound around the stator interpole IC2 in the same direction as the exciting coil L5 and in the reverse winding direction of the exciting coil L12. The stator core 11 is configured such that the stator interpole IC2 is arranged at a position shifted by a mechanical angle of 180° with respect to the stator interpole IC1.

The resolver device of the third embodiment can suppress the second harmonic wave by means of the stator main poles A1, A2, B1, B2, C1, and C2 and the stator interpoles IA1, IA2, IB1, IB2, IC1, and IC2 in a similar manner to the resolver device 1 of the first embodiment. The resolver device of the third embodiment can also cancel the third harmonic wave by obtaining the angle information after the conversion to the second phase by means of the three-phase/two-phase conversion in a similar manner to the resolver device 1 of the first embodiment. As a result, the resolver device of the third embodiment increases accuracy of the angle information, thereby improving reliability.

The resolver device of the third embodiment is suitable for a control device having the small motor 100 that is capable of performing accurate positioning and that is used in, for example, an index table of an NC machine tool, a conveying device, and a robot arm of an assembling device. In the motor 100, the rotor core 12A of the resolver device rotates in conjunction with the motor rotor 21. When the rotor core 12A rotates once, the resolver device can detect one period of the motor rotor 21, whereby an absolute angle is easily calculated.

REFERENCE SIGNS LIST

1 RESOLVER DEVICE
2 MOTOR BODY
3 BEARING
10 MOTOR DEVICE
11 STATOR CORE
12, 12A ROTOR CORE
13 RESOLVER STATOR
14 RESOLVER ROTOR
15 BOLT
16 BOLT
21 MOTOR ROTOR
22 MAGNET
23 MOTOR STATOR CORE
24 EXCITING COIL
25 HOUSING
31 COVER MEMBER
32 BOLT
33 FIXING PART
40 DETECTION CIRCUIT PART
41 CURRENT VOLTAGE CONVERTER
42 THREE-PHASE/TWO-PHASE CONVERTER
45 PHASE SHIFTER
50 RESOLVER EXCITATION CIRCUIT
51 OSCILLATION CIRCUIT
52 AMPLIFIER
60 DRIVE UNIT
61 OPERATION DEVICE
62 POWER AMPLIFIER
100 MOTOR
A1, A2, B1, B2, C1, C2 STATOR MAIN POLE
COM COMMON TERMINAL
IA1, IA2, IB1, IB2, IC1, IC2 STATOR INTERPOLE
L1 to L12 EXCITING COIL
MC MOTOR CABLE
P THE NUMBER OF MAIN POLES
q THE NUMBER OF ROTOR TEETH
Q1 to Q16 ROTOR TOOTH
SI INTERPOLE SIGNAL
SM MAIN POLE SIGNAL

The invention claimed is:

1. A resolver device comprising:
 a stator core that includes:
  a plurality of stator main poles, the number of which is an even multiple of three that is the number of phases, and that are arranged along a circumferential direction of a ring-shaped stator base such that respective exciting coils output three-phase output signals each of which is shifted by an electrical angle of +120 degrees or an electrical angle of −120 degrees in response to a one-phase excitation input signal; and
  a plurality of stator interpoles for the respective phases that are wound around by respective exciting coils connected in series to the exciting coils wound around the corresponding stator main poles, and that are arranged at a position shifted by an electrical angle of +90 degrees or an electrical angle of −90 degrees with respect to at least one of the corresponding stator main poles;

a rotor core supported so as to be freely rotatable with respect to the stator core and configured such that a reluctance component in a gap between the rotor core and the stator core changes in accordance with a relative angle position to the stator core; and a detection circuit that converts resolver current signals for the respective phases, which are output by connecting in series the exciting coils wound around the corresponding stator main poles to the exciting coils wound around the corresponding stator interpoles, into resolver voltage signals, and then subjects the resolver voltage signals to three-phase/two-phase conversion to obtain two-phase resolver signals.

2. The resolver device according to claim 1, wherein the rotor core includes rotor teeth projecting to a side facing the stator core, and when the number of the stator main poles is P and the number of the rotor teeth is q, the following Equation (1) is satisfied:

$$P = (q/(M + (N \pm 1)/N)) \quad (1)$$

where

N is three that is the number of the phases, and M is an integer variable that satisfies the Equation (1).

3. A motor comprising the resolver device according to claim 2, wherein the rotor core rotates in conjunction with a motor rotor, the resolver device is capable of detecting rotation of the motor rotor, and the motor includes pole pairs, the number of which is the same as the number of the teeth q of the rotor core.

4. The resolver device according to claim 2, wherein q in the Equation (1) is ten.

5. A motor comprising the resolver device according to claim 1, wherein the rotor core rotates in conjunction with a motor rotor, and the resolver device is capable of detecting rotation of the motor rotor.

6. An actuator comprising the resolver device according to claim 1, wherein the actuator is capable of transmitting rotary motion that is detectable by the resolver device.

* * * * *